(12) United States Patent
Franklin et al.

(10) Patent No.: US 8,371,002 B2
(45) Date of Patent: *Feb. 12, 2013

(54) LOCKING CLIP FOR A SIGN TENSIONING SYSTEM

(75) Inventors: Robert Lee Franklin, Snellville, GA (US); John Dove Gibb, Buford, GA (US); Robert B. McMurray, Brookfield, WI (US)

(73) Assignee: Formetco, Inc., Duluth, GA (US)

( * ) Notice: Subject to any disclaimer, the term of this patent is extended or adjusted under 35 U.S.C. 154(b) by 598 days.

This patent is subject to a terminal disclaimer.

(21) Appl. No.: 12/401,569

(22) Filed: Mar. 10, 2009

(65) Prior Publication Data

US 2009/0229085 A1 Sep. 17, 2009

Related U.S. Application Data

(63) Continuation-in-part of application No. 12/246,167, filed on Oct. 6, 2008, now Pat. No. 8,020,260, which is a continuation-in-part of application No. 12/174,449, filed on Jul. 16, 2008, now Pat. No. 8,042,292, and a continuation-in-part of application No. 12/104,257, filed on Apr. 16, 2008, now Pat. No. 7,836,562.

(60) Provisional application No. 60/950,025, filed on Jul. 16, 2007, provisional application No. 60/912,058, filed on Apr. 16, 2007.

(51) Int. Cl.
*F16B 2/00* (2006.01)
(52) U.S. Cl. .............. 24/346; 24/349; 24/459; 40/603
(58) Field of Classification Search .............. 24/459, 24/460, 477, 194, 171, 346, 347, 349; 40/603
See application file for complete search history.

(56) References Cited

U.S. PATENT DOCUMENTS

| | | | |
|---|---|---|---|
| 1,474,692 | A | 11/1923 | Thurau |
| 2,866,249 | A | 12/1958 | Normandin |
| 4,686,748 | A | 8/1987 | Kaivanto |
| 4,809,408 | A | 3/1989 | Abrahamson |
| 5,003,716 | A | 4/1991 | Dyar |
| 5,178,306 | A | 1/1993 | Petrou |

(Continued)

FOREIGN PATENT DOCUMENTS

| | | |
|---|---|---|
| GB | 2215766 A | 9/1989 |
| JP | 06094010 | 4/1994 |

(Continued)

OTHER PUBLICATIONS

U.S. Appl. No. 60/912,058, filed Apr. 16, 2007.

(Continued)

*Primary Examiner* — James Brittain
(74) *Attorney, Agent, or Firm* — Jason A. Bernstein; Barnes & Thornburg LLP

(57) ABSTRACT

A clip for use in a cable system for stretching a sheet across a surface and maintaining it under tension, the clip comprising a base plate and a top plate. The base plate has a pair of opposing retaining arms extending from the top surface and a recessed area defined in the base plate. The top plate has a hook protruding from the top surface having a channel defined therein. The top plate slides between the arms of the base plate and is removably retained therein and the plates engage the edge of a sheet. The hook removably engages a cable and the sheet is stretched when the cable is tensioned. The clip can be retained on the cable when a sheet is to be replaced by partially separating the two plates.

14 Claims, 10 Drawing Sheets

U.S. PATENT DOCUMENTS

| | | | |
|---|---|---|---|
| 5,467,546 A | 11/1995 | Kovalak, Jr. | |
| 6,339,889 B1 | 1/2002 | Griesemer et al. | |
| 6,789,295 B1 | 9/2004 | Svensson | |
| 6,991,693 B2 | 1/2006 | Wylie et al. | |
| 7,168,197 B2 | 1/2007 | Siegenthaler | |
| 7,836,562 B2 * | 11/2010 | Franklin et al. | 24/346 |

FOREIGN PATENT DOCUMENTS

| | | | |
|---|---|---|---|
| WO | 03098055 A1 | 11/2003 | |

OTHER PUBLICATIONS

Search Report and Written Opinion for International Patent Application No. PCT/US2008/060505; Aug. 13, 2008.

Search Report and Written Opinion for International Patent Application No. PCT/US2008/070197; Oct. 22, 2008.

Office Action for U.S. Appl. No. 12/246,167; Mar. 25, 2011.

* cited by examiner

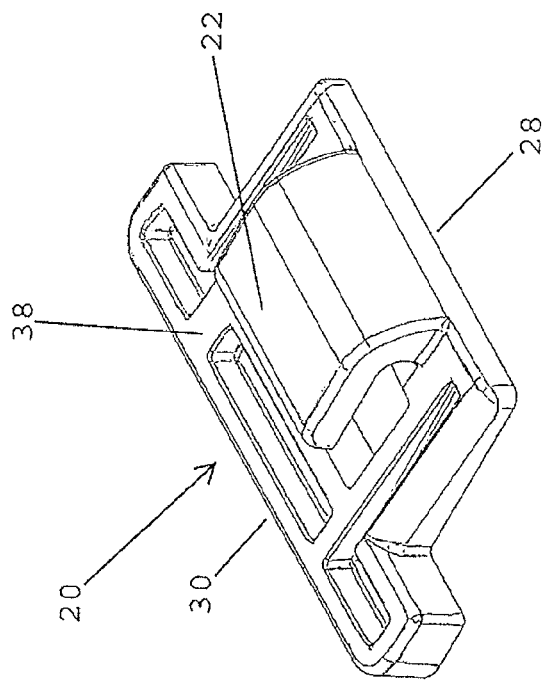
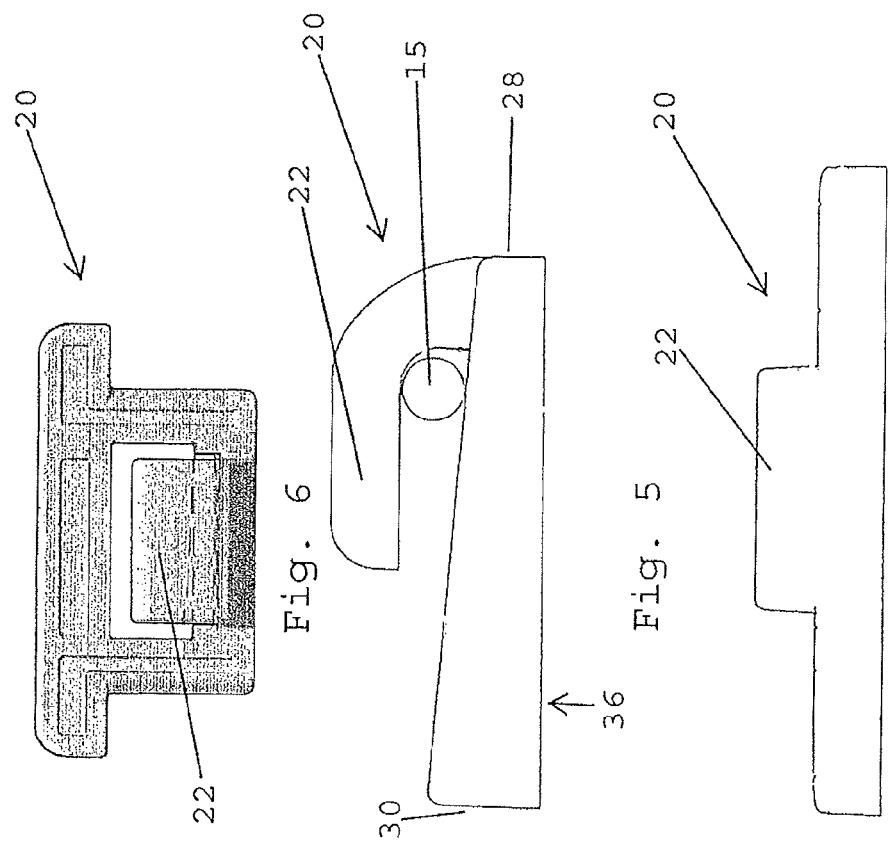

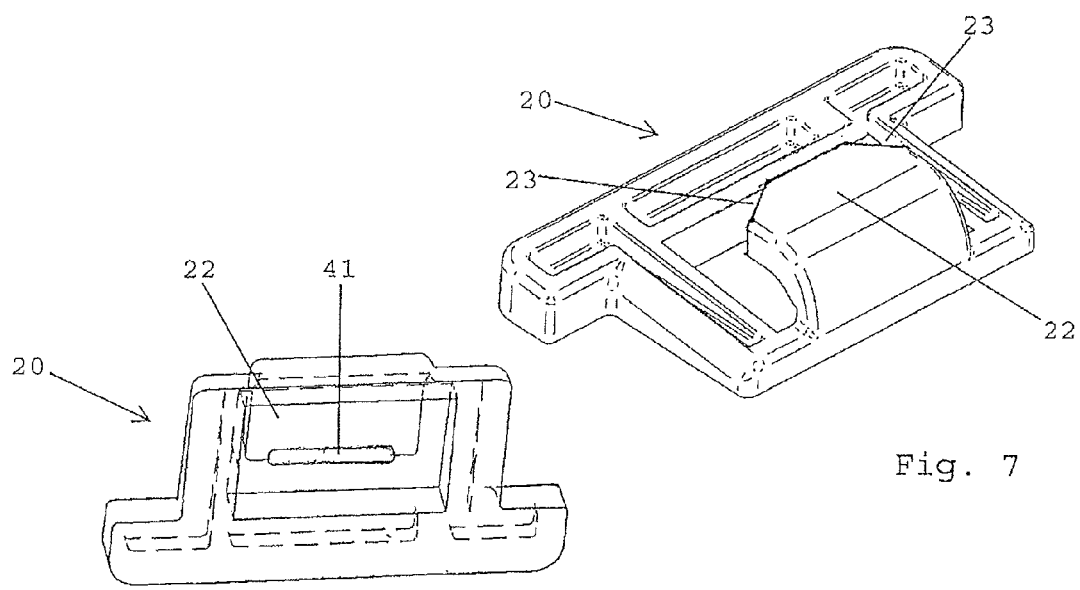
Fig. 7
Fig. 8
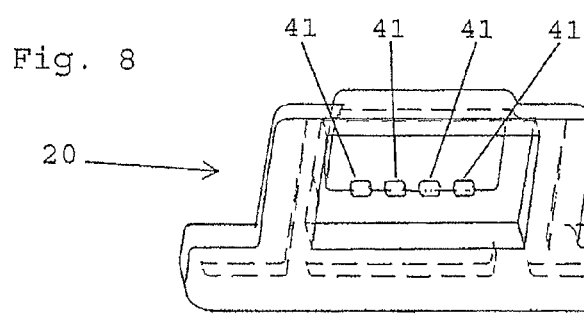
Fig. 10

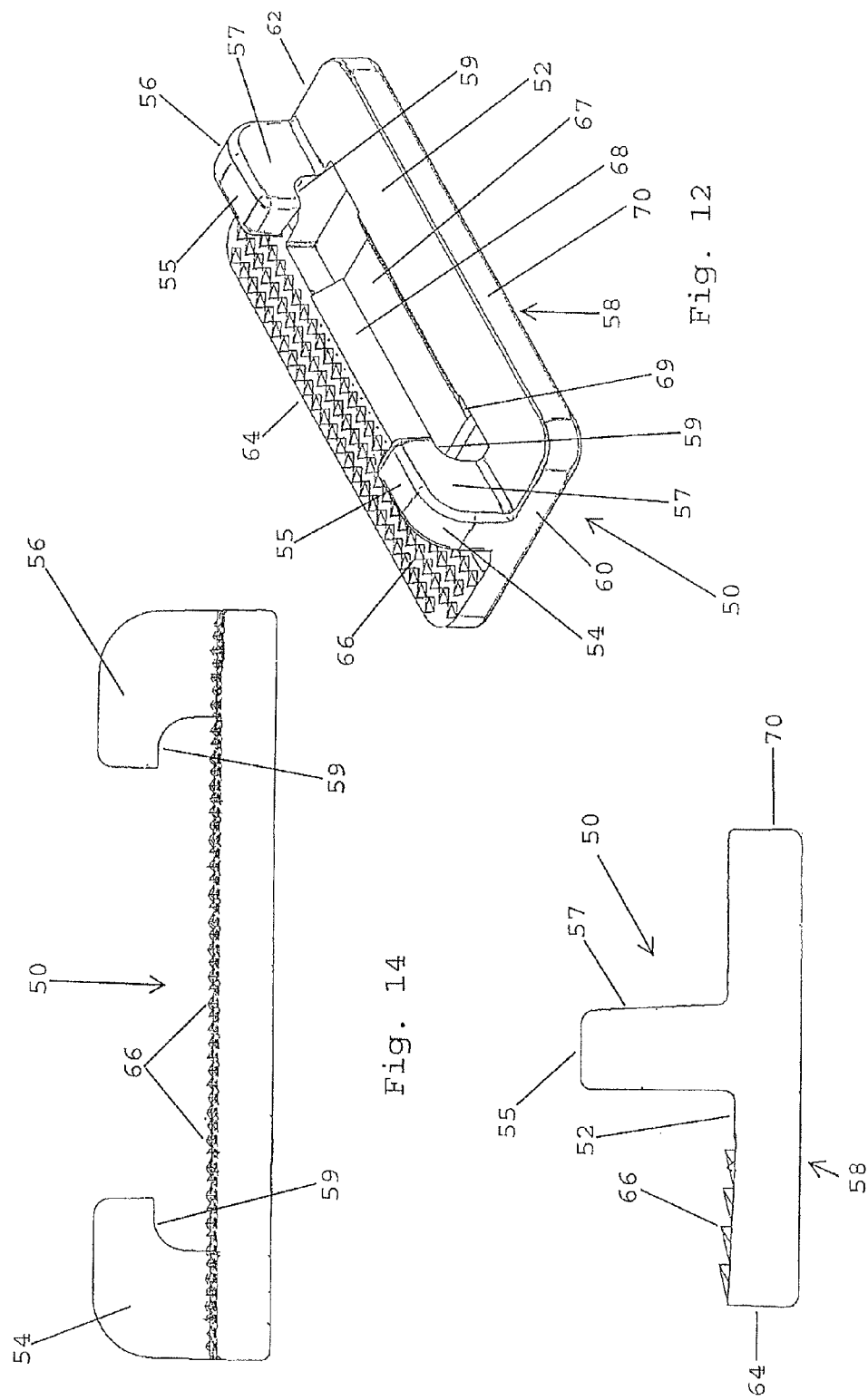

LOCKING CLIP FOR A SIGN TENSIONING SYSTEM

CROSS REFERENCE TO RELATED APPLICATIONS

This patent application is a continuation-in-part of U.S. patent application Ser. No. 12/246,167, filed Oct. 6, 2008 now U.S. Pat. No. 8,020,260, which is a continuation-in-part of U.S. patent application Ser. No. 12/104,257, filed Apr. 16, 2008 now U.S. Pat. No. 7,836,562, which claims the benefit of U.S. Provisional Patent Application No. 60/912,058, filed Apr. 16, 2007, the disclosures of which are incorporated herein by reference in their entirety. This patent application is a continuation-in-part of U.S. patent application Ser. No. 12/246,167, filed Oct. 6, 2008, which is also a continuation-in-part of U.S. patent application Ser. No. 12/174,449, filed Jul. 16, 2008 now U.S. Pat. No. 8,042,292, which claims the benefit of U.S. Provisional Patent Application No. 60/950,025, filed Jul. 16, 2007, the disclosures of which are incorporated herein by reference in their entirety.

FIELD

The present disclosure relates to locking clips for holding and maintaining a generally flat sheet of material in a tensioned or stretched condition on a billboard or similar flat backing surface.

BACKGROUND

Large printed vinyl sheets have generally replaced pasted paper signs in the outdoor advertising industry. Installation of large printed vinyl display sheets requires two or more workers who push light weight fiberglass or similar non-conductive rods through pockets heat-sealed in each of the four end surfaces of a sheet, which forms the advertising or display face of a billboard.

The vinyl sheets typically have to be hung from the top of a billboard after the top rods are secured to the billboard frame and then pulled or tensioned horizontally and vertically across the metal backing of the billboard. Various tensioning devices have been used. Generally the installation process requires at least two workers who take on average approximately 20 to 30 minutes or more to complete an installation.

The industry recently developed light weight vinyl or polyethylene display sheets, which can be recycled and cost less but are not as strong as the vinyl in predominate use today. Its lighter weight and lesser strength make the light weight vinyl or polyethylene display sheets unsuitable for heat-sealing pockets and more subject to tearing from excess tensioning and repeated installations and removals. Display sheets are frequently moved from one billboard location to another to save on printing and material costs.

U.S. Pat. No. 6,789,295 discloses a clamp apparatus for application to a plate, sheet, fabric or thin film by gripping two opposite sides of the object. A rope or cord is inserted into holes in the top and bottom units comprising the clamp apparatus. The rope or cord is secured to a stationary object. There is no accommodation for attachment to a cable, although each individual rope or cord could be tied to a cable. However, uniform tension to the display sheet can only be realized if the length of each piece of rope or cord running from each clamp apparatus around the perimeter of the display is identical. If the clamp apparatus is attached directly to the cable with the cable running through the holes in the top and bottom units, the clamp apparatus would be turned approximately 90 degrees to the face of the billboard or display surface, resulting in undesirable twists, folds, and wrinkles in the display sheet.

International Patent Publication No. WO 03/098055 issued to Gunnarsson discloses a clamp apparatus closely similar to the apparatus disclosed in U.S. Pat. No. 6,789,295. The clamp apparatus disclosed in the International Publication has the same deficiencies of U.S. Pat. No. 6,789,295 described above.

U.S. Pat. No. 4,686,748 issued to Kaivanto discloses an attachment device for gripping the edge of a sheet, but does not disclose a mechanism for removably attaching the device directly to a portion of a cable while the cable is under tension. The clamping mechanism squeezes the edge of a sheet or fabric between the curved edges of one unit and the tapered length of a second unit resulting in distortion, folding, or creasing of the sheet or fabric. This is an undesirable result for a billboard or other application where a flat display sheet is preferred. Additionally, the eyelet/rope combination of this attachment device would permit the display sheet to twist. As noted above, unless uniform lengths of rope or cord were used to attach the several clamps to a tension cable, uneven force would be applied to the display sheet resulting in folds, wrinkles, or other distortions of the display sheet.

It would be desirable to have a clip which could attach to a cable running horizontally and vertically along the perimeter of a billboard or display surface, which will minimize or eliminate twisting and wrinkling of the display sheet. It would be further desirable to have a clip which would allow application to a cable running parallel to the face of the clip and which clip would remain attached to the cable while one display sheet is removed and another installed in its place. It would be further desirable to have a clip that could be retained on the cable when a sheet is being dismounted, remounted or when the clip is not in use so that the clip is not dropped or lost. It would be further desirable to have a two-piece clip which will allow for limited movement of the two pieces with respect to each other when a sheet is detached from the clip yet prevent complete separation of the two pieces.

Kaivanto and Gunnersson disclose clips which require removal from the cable in order to become disengaged from the display sheet. To remove the sheet you have to remove the pressure. With Kaivanto, the bottom plate would fall off. It would be desirable to have a clip which could be retained on the cable during sheet changeout.

SUMMARY

The present disclosure provides a clip for use in a cable tensioning system. One aspect of the present disclosure provides a clip for use in a cable tensioning system comprising (a) a base plate comprising a generally flat base member having a front portion with a gripping surface, a middle portion containing a recess, and a rear portion with a pair of opposing retaining arms extending upward from the top surface, each arm having an angled portion angled toward the other arm, the retaining arms capable of engaging the top plate, a bottom surface, a front edge and a rear edge, and at least one slot formed in the base member; and, (b) a top plate comprising a top surface having a hook extending upward therefrom, the hook and the top surface defining a channel capable of receiving a portion of a cable, a bottom surface, and, a front portion and front edge and a rear portion and rear edge, the rear portion being wider than the front portion, wherein the top plate is adapted to secure an edge of a substantially flat medium between the base plate and the top plate when the top plate and the bottom plate are in an engaged relationship, wherein the channel can receive a portion of a cable, and the clip remains attached to the cable.

BRIEF DESCRIPTION OF THE DRAWINGS

Exemplary embodiments of the present disclosure are illustrated in the drawings in which like reference characters designate the same or similar parts throughout the figures of which:

FIG. 3 is a perspective view of a top plate according to one exemplary embodiment.

FIG. 4 is a rear elevation view of the top plate of FIG. 2.

FIG. 5 is a left side elevation view of the top plate of FIG. 2.

FIG. 6 is a top plan view of the top plate of FIG. 2.

FIG. 7 is a perspective view of a first alternative embodiment of the top plate.

FIG. 8 is a bottom perspective view of a second alternative embodiment of the top plate.

FIG. 10 is a bottom perspective view of a third alternative embodiment of the top plate.

FIG. 12 is a perspective view of the base plate according to one exemplary embodiment.

FIG. 13 is a left side view of the base plate of FIG. 2.

FIG. 14 is a front elevation view of the base plate of FIG. 2.

DETAILED DESCRIPTION

The present disclosure relates generally to a locking clip for a cable tensioning system. In a typical installation, a cable is hung on slides along the four corners and four sides of a billboard face, hidden from view by the face frame. A number of clips are attached to the display sheet, typically polyethylene or light weight vinyl, at selected intervals, commonly approximately 2-3 feet apart. Each clip releasably holds a portion of the sheet under tension. The clip has a hook with a channel or guideway through which a portion of the cable passes. For the purposes of the present disclosure the cable may refer to a portion of the cable, as the context reflects. As tension is increased on the cable by means of a spring-loaded single arm locking mechanism or other tensioning mechanism known to those skilled in the art, the tension on the display sheet is increased resulting in an overall flat, undistorted display sheet. When the display sheet is subsequently removed or replaced with another display sheet, the clips remain attached to the cable, facilitating installation of a new display sheet and preventing the disengagement of one or both clip plates from the cable. An example of a cable tensioning system is disclosed in co-pending U.S. patent application Ser. No. 12/174,449, PCT Patent Application No. PCT/US2008/070197, commonly assigned to the assignee of the present application.

Figure 1:
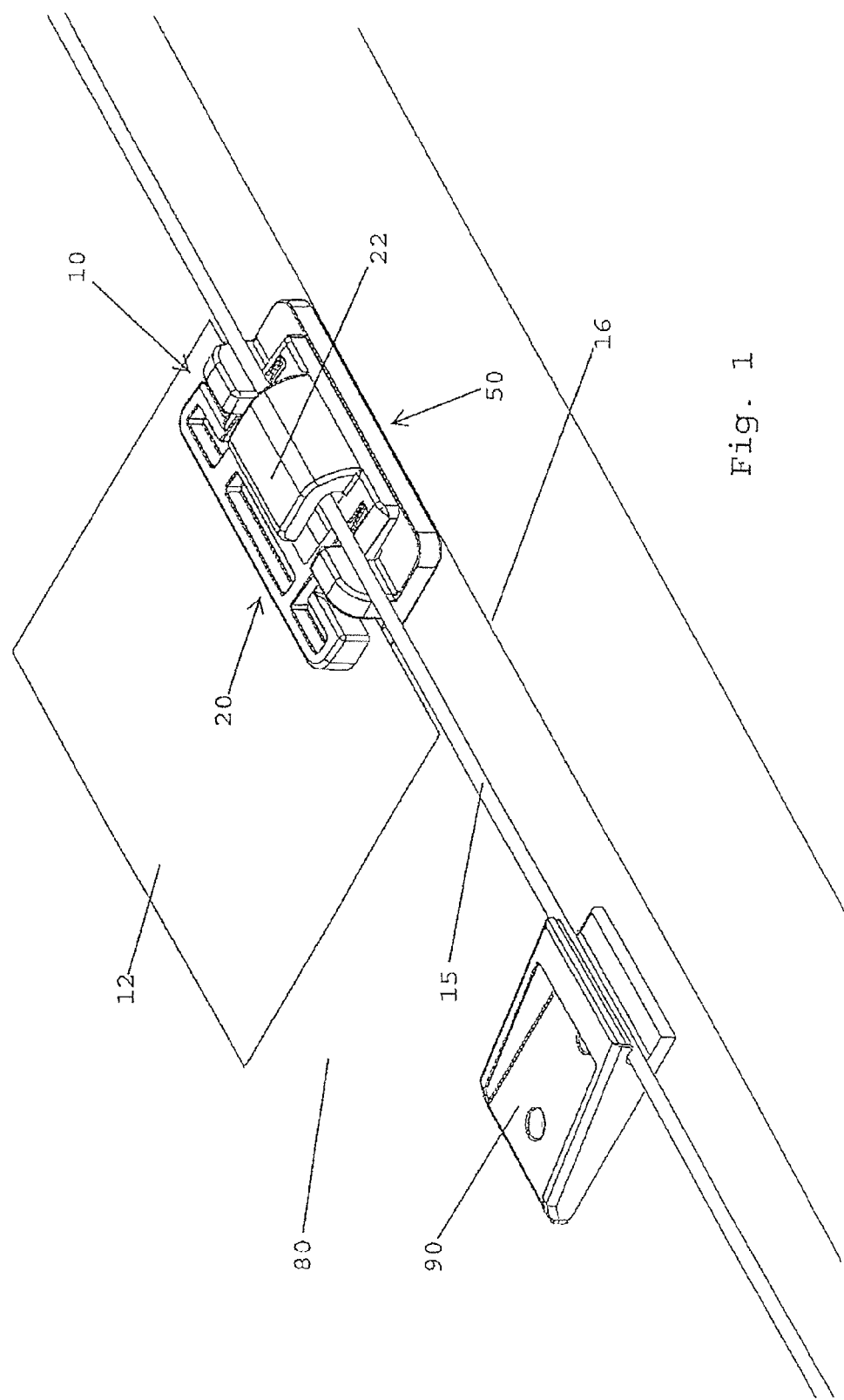
FIG. 1 is a schematic perspective view of the clip apparatus installed on a cable and holding a vinyl sheet in conjunction with a billboard, also showing a guide clip.

FIG. 1 illustrates one exemplary embodiment of the present disclosure and shows an assembled clip 10 engaging a sheet 12 and a cable 15. The cable 15 generally surrounds a billboard frame 16. The clip 10 generally comprises a top plate 20 and a base plate member 50. The clip parts may be made of a composite nylon material which provides the strength required to sustain constant tensioning pressure and withstand long-term outdoor exposure to heat, cold, sun, rain, and non-atmospheric conditions such as excessive installation pressure, tensioning pressure, and corrosive elements. Alternatively, the clip may be made of other suitable polymers, plastic, metal, alloy, ceramic, wood, combinations and mixtures thereof, and the like. The top plate 20 and base plate 50 may be made of the same or different materials.

Figure 2:
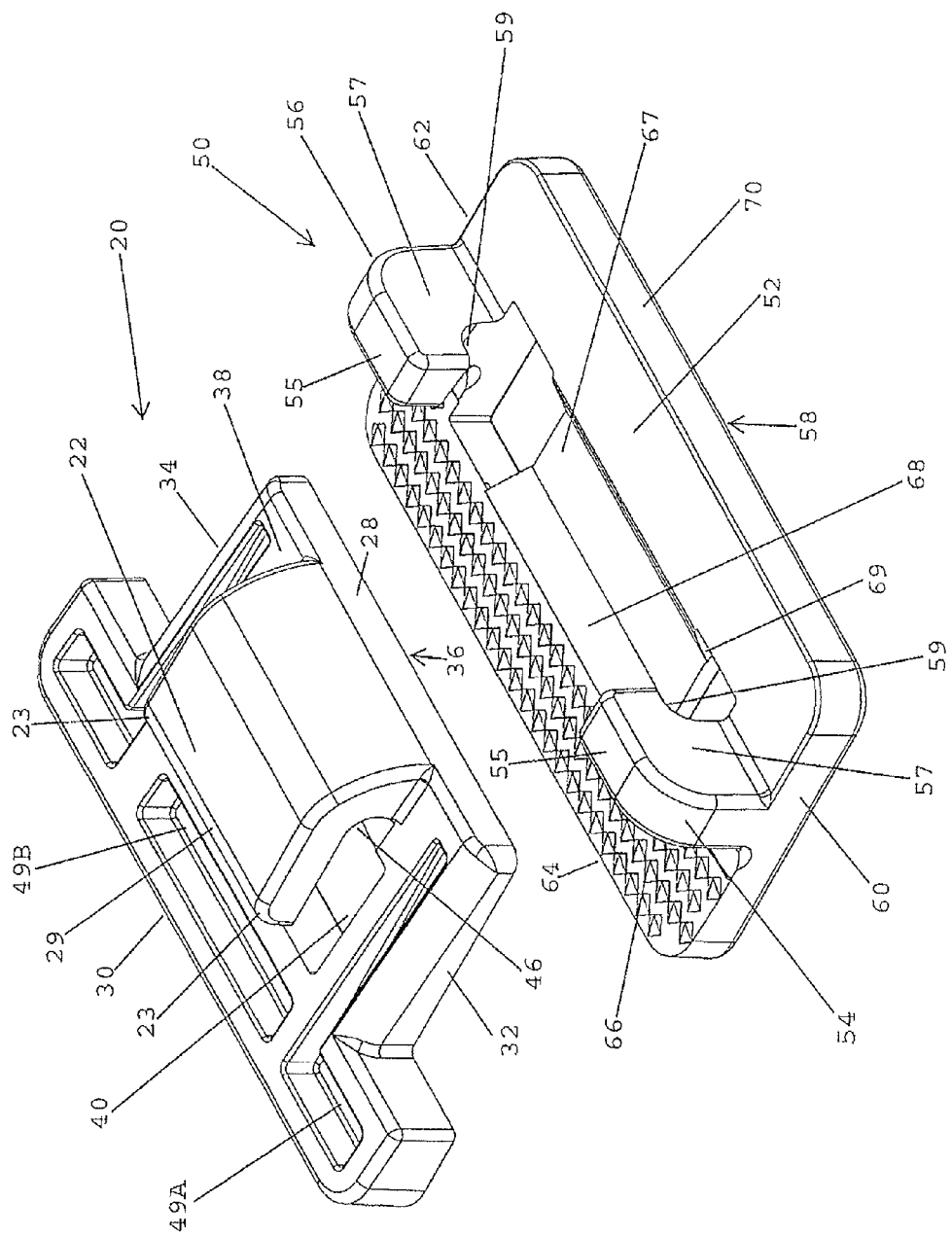
FIG. 2 is a perspective view of a top and bottom plate of the embodiment of FIG. 1.

As shown in FIGS. 2-6, the top plate 20 has a hook 22 having corners 23 and an interior recess portion or channel 46 (which preferably is rounded) through which a cable 15 passes and can be retained. The top plate 20 has a front edge 28, rear edge 30, first side 32, second side 34, bottom surface 36, and top surface 38. As shown in FIG. 2, the thickness of the top plate 20 preferably tapers toward the front edge 28 from the rear edge 30. The tapering may be from edge to edge, or, alternatively, the tapering can be a portion of the distance from edge to edge. The tapering allows the cable 15 to slide within the hook 22 and facilitates the insertion, gripping and locking functions when the top plate 20 is engaged with the base plate 50. Alternatively, rather than a straight taper, the top plate 20 may have a curved portion. Free or substantially unimpeded lateral movement of the cable 15 within the channel 46 is preferable for smooth operation of the cable tensioning system. Alternatively, for certain applications the hook 22 and channel 46 may form a snug fit over the cable 15. Optionally, the top plate 20 may have one or more open or reduced thickness areas 49A and 49B proximate to the rear edge 30 and a slot 40 between the front edge 28 and the rear edge 30 which reduce the amount of material needed and the weight of the part. The areas 49A and 49B may be recessed areas extending from the top surface partially toward the bottom surface, or, may be from one surface through to the other surface.

Figure 9:
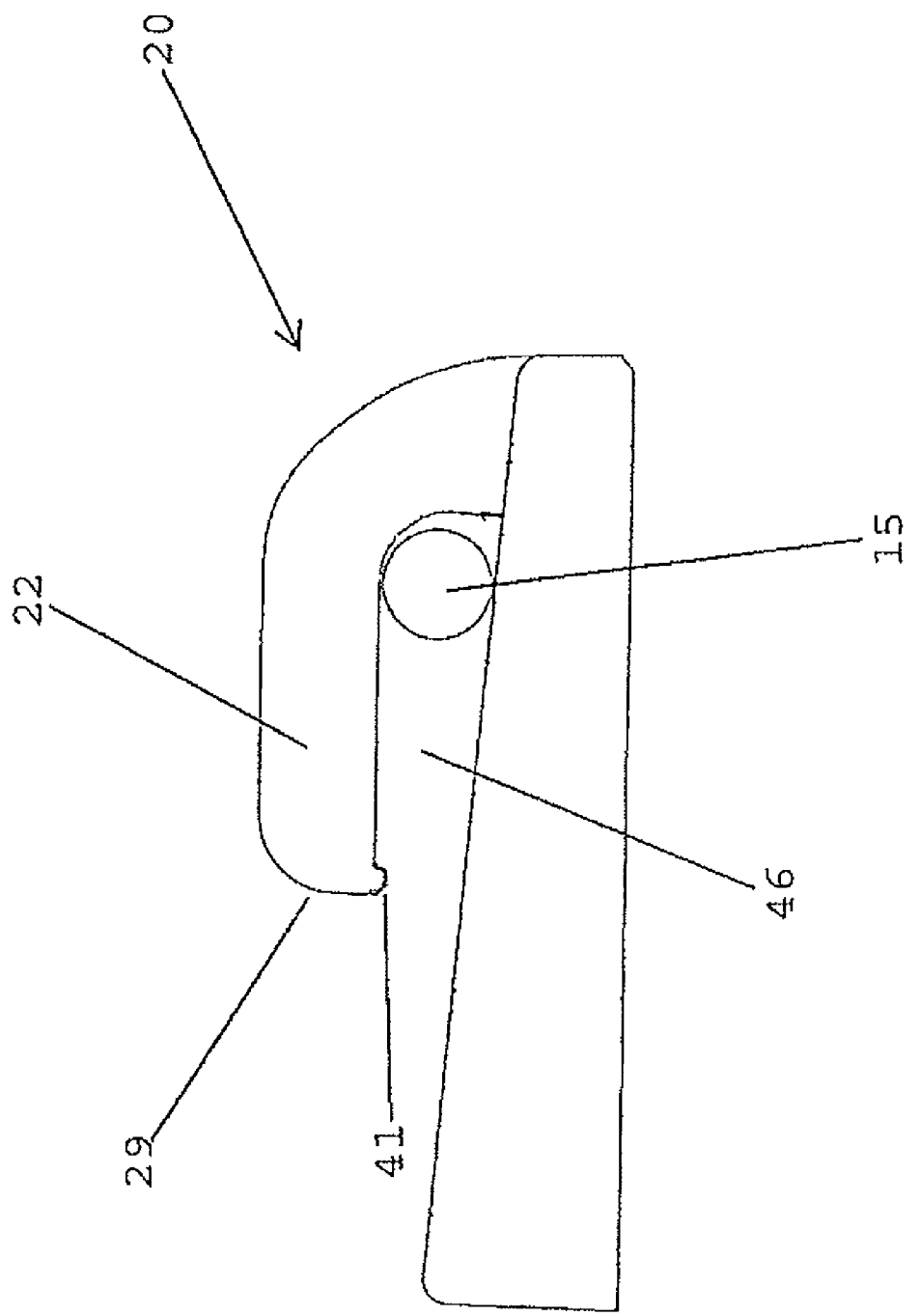
FIG. 9 is a left side elevation view of the top plate of FIG. 2.

In a variation of this embodiment (shown in FIG. 7) the corners 23 may be angled or beveled, preferably at about 45 degrees (although other angles are usable), to facilitate the attachment of the assembled clip apparatus 10 to the cable 15. In another variation of this embodiment (shown in FIGS. 8-10), the hook 22 may have at least one lip (FIGS. 8 and 9), nub, rib, tooth (FIG. 10) or other protrusion 41 along the bottom of the leading edge 29 of the hook 22, which protrusions assist in preventing the top plate 20 from becoming disengaged from the cable 15. The length and height of the hook 22 and/or the shape of the channel 46 can be modified to accommodate different diameter or shape cable or other article.

Figure 11:
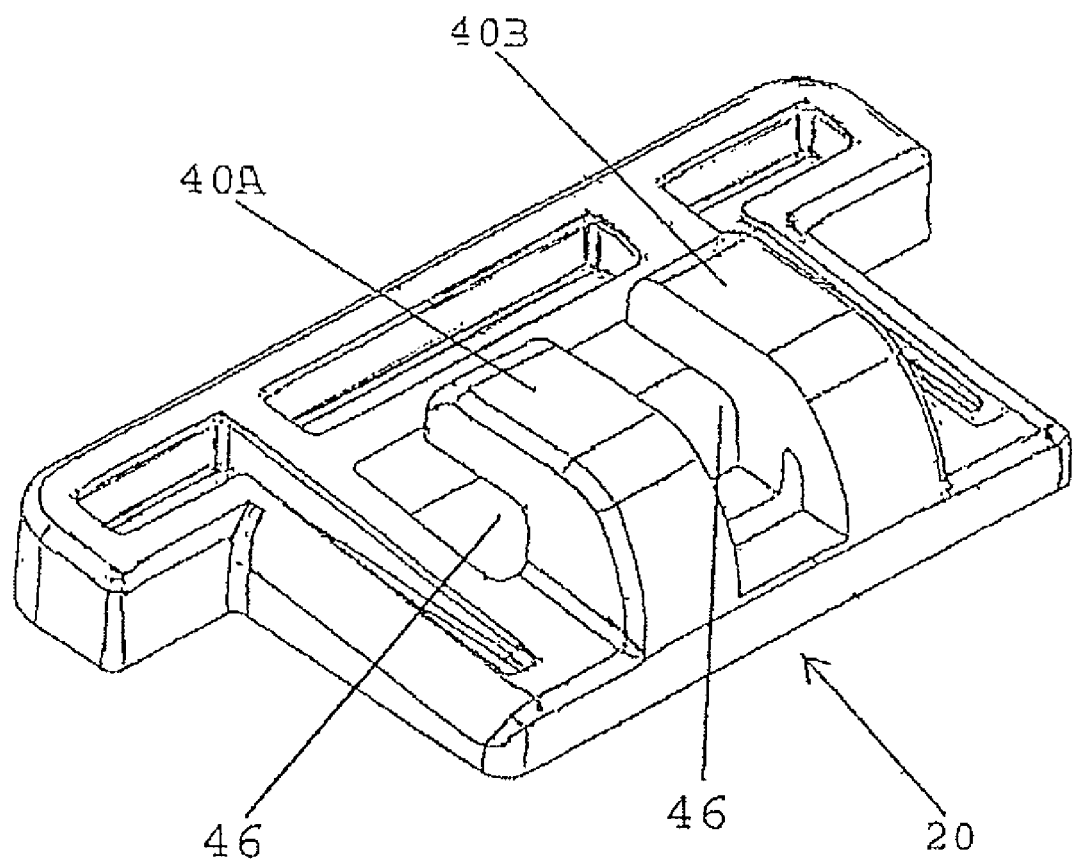
FIG. 11 is a perspective view of a fourth alternative embodiment of the top plate.

In an alternative embodiment, shown in FIG. 11, the hook 22 can comprise a plurality of spaced apart narrower fingers 40A, 4013, each finger generally shaped like the hook 22 (though narrower in width). While two such fingers 40A, 40B are shown, more fingers may be used.

As shown in FIGS. 3 and 5, the thickness of the top plate 20 preferably tapers from the front portion 28 toward the rear portion 30. The tapering may be from the rear edge 30 to the front edge 28, or, alternatively, the tapering can be a portion of the distance from front edge to rear edge. The tapering allows the cable 15 to slide within the hook 40 and facilitates the insertion, gripping and locking functions when the top plate 20 is engaged with the base plate 50. Alternatively, rather than a straight taper, the top plate 20 may have a curved portion.

Free or substantially unimpeded lateral movement of the cable 15 within the channel 46 is preferable for smooth operation of the cable tensioning system.

FIGS. 12-14 show the base plate 50 having a top surface 52 and two retaining arms 54, 56 extending upward from the base plate 50 and facing each other. Each retaining arm has a side face 57 and a top face 55. The retaining arms 54, 56 provide a friction fit with the top surface 38 of the top member 20. The bottom edge 59 of each retaining arm 54, 56 may be angled to facilitate insertion of the top plate 20 into the base plate 50, and to apply consistent pressure upon the tapered top surface 38 of the top plate 20. The base plate 50 has a bottom surface 58 and sides 60, 62. A portion of the top surface 52 (proximate to the front edge 64) preferably has a gripping surface, comprising a series of surface irregularities, such as protrusions 66 extending from the first side 60 to the second side 62 (or at least a portion thereof) to provide a friction fit against a portion of the bottom surface 36 of the top member 20 and to prevent premature separation of the top plate 20 from the base plate 50, yet still permit separation by manually pushing or pulling the two parts apart. The protrusions 66 can be teeth, protrusions, bumps, ribs, ridges, spikes, or the like. Alternatively, the surface irregularities can be grooves, indentations, channels, detents, divots, or the like. Preferably, the protrusions 66 have a relatively sharp end (FIG. 14) to engage a sheet 12 (described hereinbelow in greater detail). In the middle of the base plate 50 between the two tension arms 54, 56 is recessed area 67 extending generally parallel to the front 64 and rear edges 70. A beveled or curved edge 68 of the recessed area closest to the front edge 64 of the base plate allows display sheets with differing edge thickness to be captured between the top and base plate. The recessed area 67 may extend partially or fully from the top surface 52 to the bottom surface 58. A beveled or curved edge 69 of the recessed area portion proximate to the rear edge 70 of the base plate 50 facilitates both insertion of the top plate 20 into the base plate 50 and removal of the display sheet 12 upon partial disengagement of the top plate 20 from the base plate 50.

The top surface 52 of the base plate 50 may taper or angle downward at a portion extending from the front edge 64 toward the rear edge 70 to increase the amount of pressure between the top member 20 and the base plate 50 when pressed together.

Figure 15:
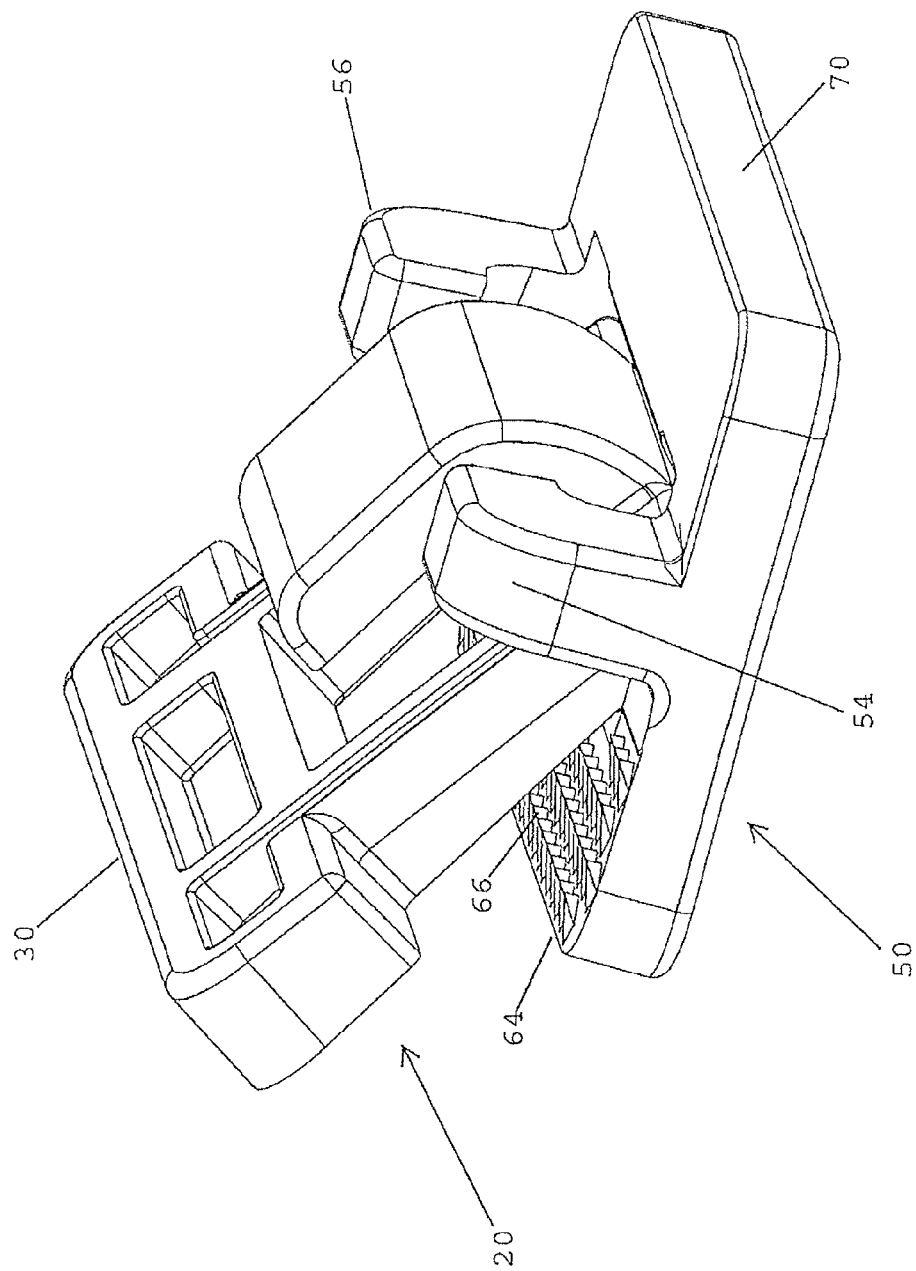
FIG. 15 is perspective view of the top plate partially inserted into the recessed area in the base plate.
Figure 16:
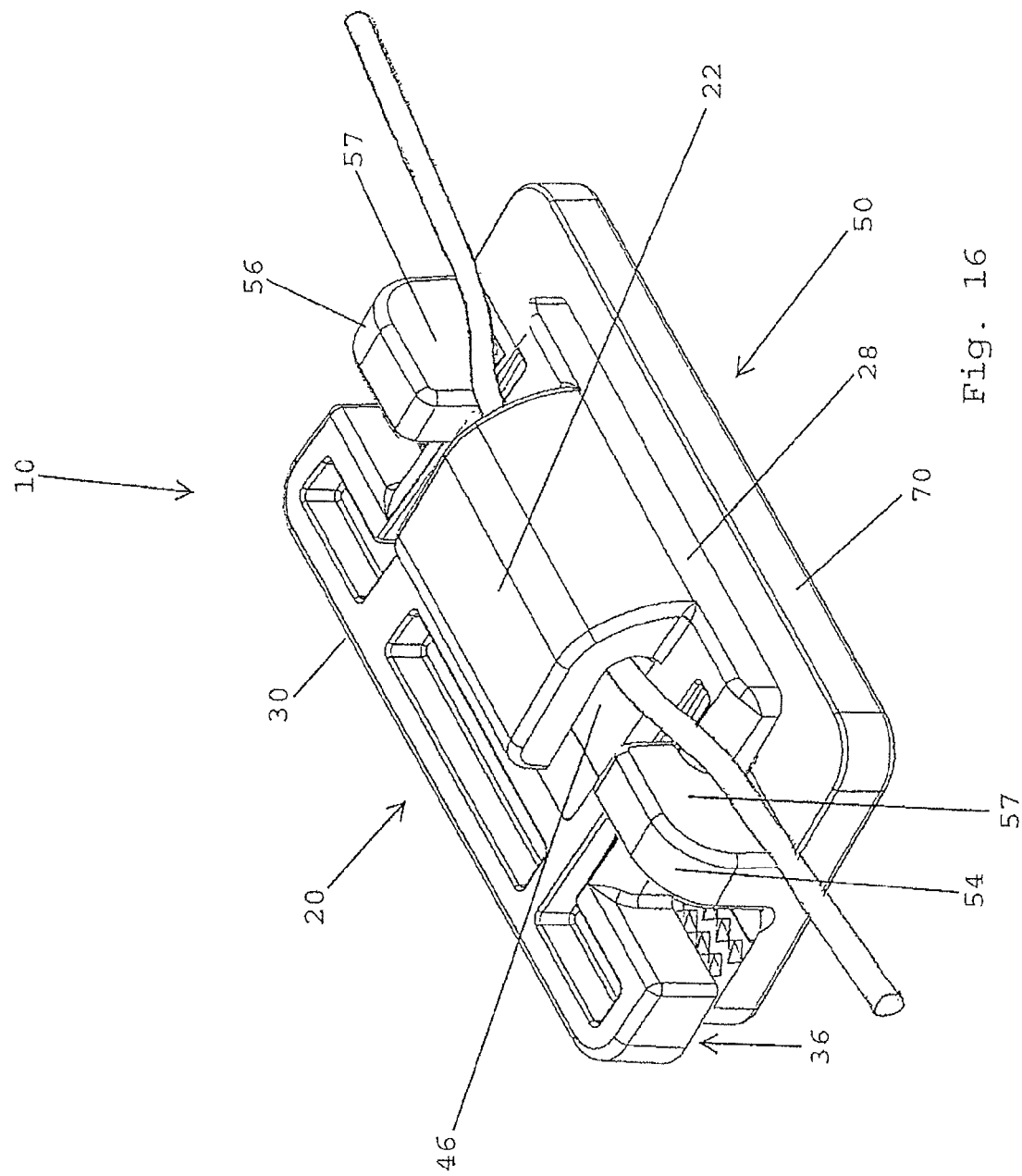
FIG. 16 is a perspective view of the top plate inserted into the base plate and including a cable engaged by the hook.
Figure 17:
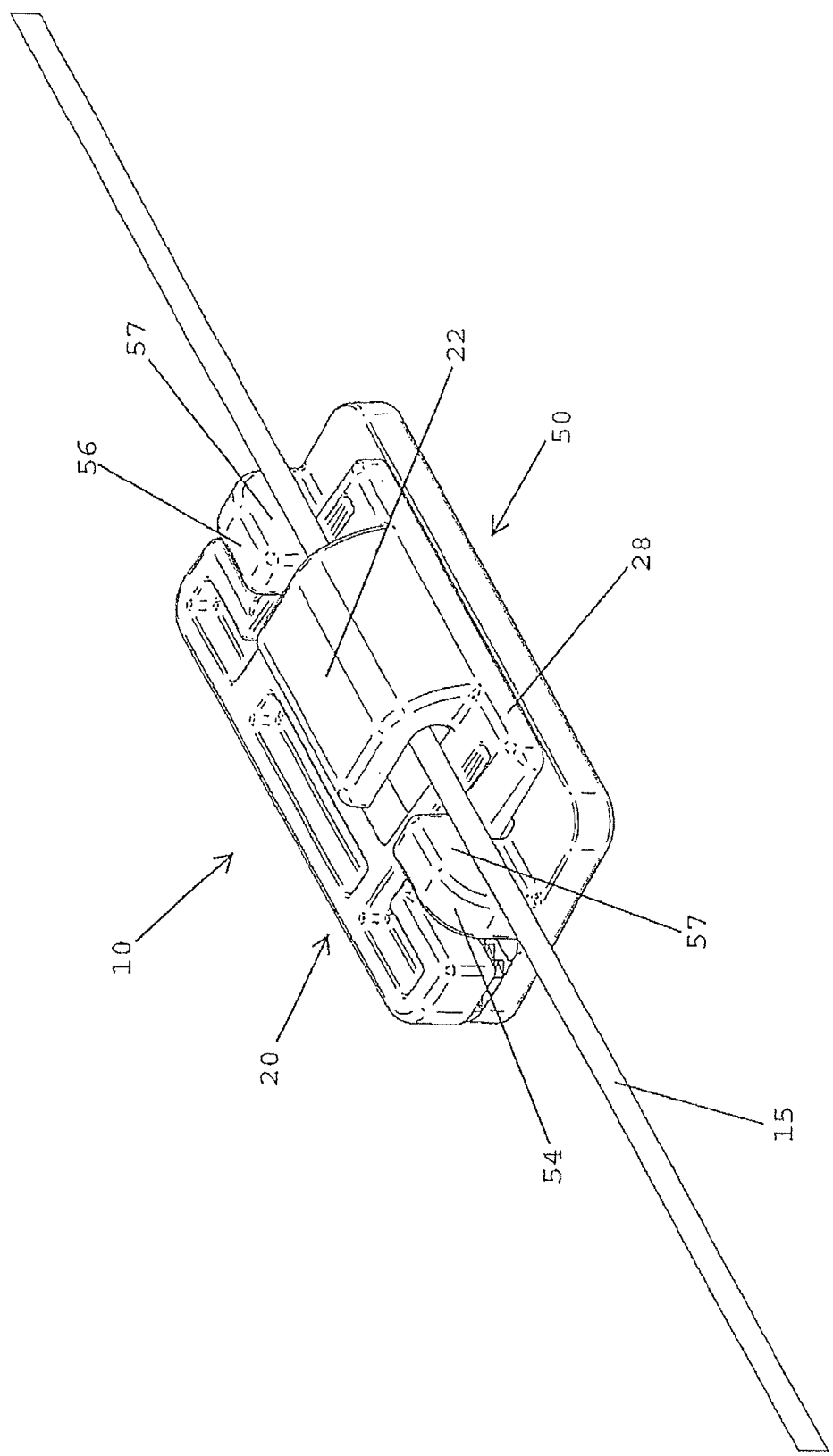
FIG. 17 is a perspective view of the top plate fully inserted into the base plate.

In assembly and operation (see FIGS. 15-17), the front edge 28 of the top plate 20 is inserted over the front edge 64 forward and between the arms 54, 56 with the edge of a display sheet 12 positioned between the top plate 20 bottom surface 36 and the protrusions 66 of the base plate 50 top surface 52 (see FIGS. 1 and 15). Hand pressure is generally applied to the rear edge 30 of the top plate 20 and the rear edge 70 of the base plate 50 sufficient to guide the front edge 28 into a portion (i.e., partially or fully into) of the recessed area 67 and then between the arms 54, 56 until the tapered portion of the top plate 20 is partially wedged within the arms 54, 56. The cable 15 is inserted in the channel 46 (FIG. 16) and around the arms 54, 56 with the cable 15 being on the side faces 57 of the arms 54, 56. At this time the sheet 12 can be inserted or removed from the clip 10 while the clip 10 is loosely maintained on the cable 15. To fully grasp the sheet 12, the top plate 20 is more fully inserted through the retaining arms 54, 56 until snug, as shown in FIG. 1. When tension is applied to the cable, the display sheet 12 is stretched on the face 80 of a billboard along the billboard frame edge 16. FIG. 1 also shows a conventional guide clip 90, known to those skilled in the art, which may be used to retain the cable 15 in its preferred location on the billboard.

A single worker can install a display sheet 12 using a cable tensioning system. This is in comparison to conventional systems, which require several workers. The reduction in time to install the display sheet represents a significant time and expense savings to the installation company.

The assembled clip, engaged with the stretched sheet 12 and the cable 15 is shown in FIG. 1 which also shows a conventional guide clip 90 and a billboard frame 16, known to those skilled in the art. A number of clips 10 are assembled around the periphery of the billboard frame 16 retaining the cable 15 around the periphery with the display sheet 12 attached to the clips 10. As tension is applied to the cable 15 the display sheet 12 is stretched across the face of the billboard frame 16 holding the display sheet 12 flat with minimal or no twisting, wrinkling, or other distortion.

The clip 10 provides the operator the option of attaching the clips 10 to a display sheet 12 off-site in a weather-protected facility. After attaching the clips 10 to the display sheet 12, the worker can transport the sheet 12 to the installation site where the clips 10 are attached to the cable 15 using the hooks 22. Once a clip 10 is attached to the cable 15 using the hook 22, the base plate 50 and the top plate 20 remain attached together as a result of the cable 15 running through the channel 46 of the hook 22 and resting on the side faces 57 of the arms 54, 56. When required, the untensioned cable 15 can be disengaged from the clip 10 by pulling the cable 15 from under the hook 22.

When an operator needs to replace the display sheet 12, the clip 10 parts are loosened by sliding the front edge 28 of the top plate 20 toward the main part of the sheet 12, which "unwedges" the top plate 20 from between the retaining arms 54, 56 and allows the operator to remove the sheet 12. The cable 15 running through the hook 22 and on the side faces 57 of the retaining arms 54, 56 prevents detachment from the cable 15 as well as separation of the base plate 50 from the top plate 20. The clip 10 remains attached to the cable 15 and the operator can attach a replacement display sheet 12 to the clip 10 without concern that the clip 10 or either of the plates 20, 50 will disengage and fall off the cable 15

It is to be understood that the locking clip of the present disclosure can be used or adapted to be used with other types of systems or be used to grip any suitable type of surface, such as, but not limited to, tent fabric, paper, film, cotton, wood, ceramic, composite or other natural or synthetic fiber (woven or nonwoven material), combinations of the foregoing and the like. The clip of the present invention can be adapted to secure relatively inflexible surfaces (such as, but not limited to, metal sheeting, glass, plastic, wood, composites, ceramic, combinations of the foregoing, and the like), such as, for example, by incorporating a rubberized, nonslip, tacky or other friction-type surface on or as part of the engaging surfaces 36 and 52.

In addition, configuration of the top plate and the retaining arms 54, 56 can be modified for different applications, such as for use with thicker cable or different cross-sectional shape cable, where the cable is instead a rod or pipe, or the like.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

All patents, patent applications and publications referred to herein are incorporated by reference in their entirety.

What is claimed is:

1. A clip for use in a cable tensioning system, the clip comprising:
   a. a base plate comprising
      i. base plate having
         1) a top surface having a plurality of surface irregularities,
         2) a bottom surface,
         3) a front edge,
         4) a rear edge,
         5) a pair of opposing retaining arms extending from said top surface; and,
         6) a recessed area defined in said base plate; and,
   b. a top plate engageable by said tensioning arms and comprising
      i. a top plate top surface,
      ii. a top plate bottom surface,
      iii. a top plate front edge,
      iv. a top plate rear edge the thickness of at least a portion of said top plate top surface plate tapering from said top plate rear edge toward said top plate front edge,
      v. a hook extending from said top plate top surface proximate to said top plate rear edge and having a channel defined therein,
   wherein said clip is adapted to secure an edge of a substantially flat medium between said base plate and the top plate when said top plate and said bottom plate are in an engaged relationship,
   wherein said hook can be removably attached to portion of a cable,
   wherein when said cable is engaged said clip will remain attached to the portion of said cable,
   wherein said recessed area of said base plate can receive said front edge of said top plate when inserted therein,
   wherein when said base plate and said top plate are in an engaged but slightly separated relationship defining a first position and said channel loosely engages said cable while permitting generally free lateral movement of said cable within said channel, an edge of a substantially flat medium can be inserted or removed from between a portion of said top plate and said base plate, and
   wherein when said base plate and said top plate are in an engaged and locked relationship defining a second position and said channel engages said cable, said substantially flat medium can be gripped between said base plate and said top plate and maintained under tension in a substantially flat and unwrinkled state.

2. The clip of claim 1, wherein a portion of said base plate tapers from said front edge toward said rear edge.

3. The clip of claim 1, wherein said recessed area has a first edge, a portion of which is beveled.

4. The clip of claim 1, wherein said recessed area has a front edge, a rear edge, a portion of each of which is beveled.

5. The clip of claim 1, wherein said top plate is sized to engage said base plate tensioning arms and at least a portion of said base plate top surface so as to form a friction fit.

6. The clip of claim 1, wherein said bottom front edge of said top plate is either beveled or rounded.

7. The clip of claim 1, wherein said base plate further comprises at least one protrusion extending from said base plate top surface for engaging said medium.

8. A clip for use in a cable tensioning system for engaging and removably retaining a portion of a sheet to be stretched and attached to a tensioned cable, the clip comprising:
   a. a base plate comprising
      i. a generally flat base member having
         1) a top surface comprising a front portion having a gripping surface, a recessed middle portion, and a rear portion,
         2) a pair of opposing first retaining arms extending upward from said top surface, each first arm having a bottom portion angled toward the rear portion, said arms being disposed on either side of and at least partially directly over said recessed middle portion;
         3) a bottom surface, and,
         4) a front edge and a rear edge; and
   b. a top member comprising
      i. a top surface,
      ii. a bottom surface,
      iii. a front portion and front edge and a rear portion and rear edge, said top member top surface tampering from said rear edge to said front edge, and,
      iv. a hook extending upward from said front edge of said top member top surface, said hook having a leading edge, said hook and said top surface defining a channel capable of receiving a portion of said cable,
   wherein said first retaining arms are capable of engaging a portion of the top member,
   whereby when said clip is attached to a cable and said cable is disposed between said front edge and said rear edge of said base plate and said top plate so as to substantially maintain the flatness of the portion of said sheet engaged by said clip and wherein said sheet can be attached and detached from the clip while said clip remains attached to the portion of cable running through said channel.

9. The clip of claim 8, wherein said top plate top surface tapers from said rear portion toward said front portion.

10. The clip of claim 8, wherein said hook further comprises at least one protrusion projecting from said leading edge toward said top plate top surface such that said height of said opening proximate to said leading edge is smaller than the diameter of a cable inserted therein, said cable being insertable by deformation of the cable or flexing of said hook, wherein said at least one protrusion restricts inadvertent detachment from the cable.

11. The clip of claim 8, wherein said hook has a base end associated with said top surface of said top member, said hook leading edge extending at least partially over said top member, said channel being defined by the open area between said leading edge, base end and said top member top surface, said channel having height proximate said base end greater than the height proximate said leading edge, said hook having a depth greater than the greatest height of said channel.

12. The clip of claim 11, wherein said channel is dimensioned such that when said cable is under tension and said hook engages said cable and said base plate engages said top member, then said tensioned cable cannot be removed from said channel.

13. The clip of claim 11, wherein said hook is dimensioned such that when said top member and said bottom plate are engaged said channel is further defined by an edge of said arms such that a tensioned cable passing through said channel cannot be disengaged, but when said top member and said bottom plate are partially separated an untensioned cable can be disengaged from said channel.

14. A clip for use in a cable tensioning system for engaging and removably retaining a portion of a sheet to be stretched and attached to a tensioned cable, the clip comprising:

a. a base plate having a pair of opposing arms extending therefrom and further having a recess formed below said arms;
b. a top member removably and slidingly engageable with said base plate arms, whereby said sheet can be removably gripped between a portion of said base plate and said top member
c. a hook extending from said top member, said hook having a base end associated with said top member, said hook further having a leading edge defining an opening, and first and second sides, said hook opening having a depth and being removably engageable with a portion of said cable; and,
d. a channel for receiving a portion of said cable, said channel being defined by said hook and said arms when said base plate and said top member are at least partially engaged, such that said hook is positioned between said arms and said arms are positioned between said leading edge and said base end, wherein an untensioned cable can be removed from said channel through said opening in said hook while a tensioned cable is not removable from said channel.

* * * * *